(12) United States Patent
Numajiri et al.

(10) Patent No.: US 8,215,912 B2
(45) Date of Patent: Jul. 10, 2012

(54) WIND TURBINE GENERATOR

(75) Inventors: Tomohiro Numajiri, Tokyo (JP); Yoshihiro Fujioka, Nagasaki (JP); Atsushi Imanaga, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 113 days.

(21) Appl. No.: 12/680,664

(22) PCT Filed: Feb. 10, 2010

(86) PCT No.: PCT/JP2010/051994
§ 371 (c)(1),
(2), (4) Date: Mar. 29, 2010

(87) PCT Pub. No.: WO2011/099132
PCT Pub. Date: Aug. 18, 2011

(65) Prior Publication Data
US 2011/0293425 A1 Dec. 1, 2011

(51) Int. Cl.
*F03D 7/04* (2006.01)
*F03D 11/00* (2006.01)

(52) U.S. Cl. ............... 416/146 A; 416/155; 416/157 R; 416/158; 416/174; 416/205

(58) Field of Classification Search ............. 416/146 A, 416/155, 157 R, 158, 174, 205
See application file for complete search history.

(56) References Cited

U.S. PATENT DOCUMENTS

| 5,749,660 | A | * | 5/1998 | Dusserre-Telmon et al. | . 384/475 |
| 6,991,378 | B2 | * | 1/2006 | Jacquemont et al. | ......... 416/174 |
| 7,077,630 | B2 | | 7/2006 | Wobben | |
| 7,658,594 | B2 | | 2/2010 | Christensen et al. | |
| 2006/0188371 | A1 | * | 8/2006 | Christensen et al. | ......... 416/147 |

FOREIGN PATENT DOCUMENTS

| JP | 61181641 A | 8/1986 |
| JP | 2005501195 T | 1/2005 |
| JP | 2005524020 T | 8/2005 |
| JP | 2006336548 A | 12/2006 |

OTHER PUBLICATIONS

ISR for PCT/JP2010/051994 dated Feb. 10, 2010.

* cited by examiner

*Primary Examiner* — Igor Kershteyn
(74) *Attorney, Agent, or Firm* — Kanesaka Berner & Partners LLP

(57) ABSTRACT

There is provided a wind turbine generator that includes an improved grease supply and discharge system of lubricant oil used in a blade rotating ring bearing of a wind turbine blade, and can reliably recover discharged grease. The wind turbine generator includes a pitch control mechanism that can adjust a pitch angle of the wind turbine blade via the blade rotating ring bearing provided between the wind turbine blade and a rotor head, a grease supply and discharge device is provided in the rotor head, and the grease supply and discharge device includes a grease supply device that pumps lubricant oil in a supplied grease tank with a grease supply pump and supplies the lubricant oil to the blade rotating ring bearing, and a grease discharge device that forcibly sucks and recovers the discharged grease from the blade rotating ring bearing.

8 Claims, 3 Drawing Sheets

WIND TURBINE GENERATOR

RELATED APPLICATION

The present application is based on, and claims priority from, International Application Number PCT/JP2010/051994, filed Feb. 10, 2010, the disclosure of which is hereby incorporated by reference herein in its entirety.

TECHNICAL FIELD

The present invention relates to a wind turbine generator including a pitch control mechanism that can change a pitch angle of a wind turbine blade, and more particularly to a wind turbine generator including an improved grease supply and discharge system (structure) of lubricant oil used in a blade rotating ring bearing of a wind turbine blade.

BACKGROUND ART

A wind turbine generator is an apparatus in which a rotor head including a wind turbine blade is rotated by wind power, and a generator driven by increasing the speed of the rotation with a gear box or the like generates electricity.

The above-described rotor head is mounted to an end of a nacelle that is provided on a wind turbine tower (hereinafter referred to as "tower") and can yaw, and supported rotatably around a substantially horizontal, lateral rotation axis.

A conventional wind turbine generator includes a pitch control device that changes a pitch angle of a wind turbine blade depending on wind speed. The pitch control device is a device for setting an optimum pitch angle of each wind turbine blade depending on wind speed and controlling rotational speed of a rotor head.

For the pitch control device to be able to adjust a pitch angle of the wind turbine blade, a blade rotating ring bearing is used that rotatably supports the wind turbine blade on the rotor head. The blade rotating ring bearing uses a rolling bearing with a rolling element (such as a ball bearing or a roller) provided between an inner ring and an outer ring.

To the blade rotating ring bearing, lubricant oil (grease) for lubricating a bearing slide portion is supplied. An automatic grease supply device installed in the rotor head is used to supply the lubricant oil, and degraded lubricant oil is pushed out by supplied grease and recovered as discharged grease in a reservoir tank in the rotor head.

Patent Literature 1 listed below describes automatic grease supply of a wind turbine in which a control device controls a grease supply pump to discharge grease from a nozzle and thus automatically supply the grease without contact.

CITATION LIST

Patent Literature

{PTL 1} Japanese Unexamined Patent Application, Publication No. 2006-336548

SUMMARY OF INVENTION

Technical Problem

In the conventional wind turbine generator, the lubricant oil used for lubricating the blade rotating ring bearing is supplied by the automatic grease supply device, but the degraded used lubricant oil (discharged grease) is merely pushed out of the blade rotating ring bearing and recovered in the reservoir tank in the rotor head. Specifically, the conventional wind turbine generator includes a pump of the automatic grease supply device for supplying the lubricant oil, but does not particularly include means for forcibly recovering the discharged grease in the reservoir tank, and thus it is difficult to reliably recover a full amount of discharged grease.

The lubricant oil that is not recovered in the reservoir tank may leak to the outside through an oil seal of the blade rotating ring bearing, and thus a grease supply and discharge system of lubricant oil used in a blade rotating ring bearing of a wind turbine blade is desired to reliably recover discharged grease.

The present invention is achieved in view of the above-described circumstances, and has an object to provide a wind turbine generator that includes an improved grease supply and discharge system of lubricant oil used in a blade rotating ring bearing of a wind turbine blade, and can reliably recover discharged grease.

Solution to Problem

To achieve the above-described object, the present invention adopts the following solutions.

The present invention provides a wind turbine generator in which a rotor head rotated by wind power applied to a wind turbine blade drives a generator installed in a nacelle and generates electricity, the nacelle is installed on an upper end of a tower standing on a foundation, and a pitch control mechanism is provided that can adjust a pitch angle of the wind turbine blade via a blade rotating ring bearing provided between the wind turbine blade and the rotor head, including a grease supply and discharge device in the rotor head, the grease supply and discharge device including a grease supply device that pumps lubricant oil in a supplied grease tank with a pump and supplies the lubricant oil to the blade rotating ring bearing, and a grease discharge device that forcibly sucks and recovers discharged grease from the blade rotating ring bearing.

According to the wind turbine generator, the apparatus includes the grease supply and discharge device in the rotor head, and the grease supply and discharge device includes the grease supply device that pumps the lubricant oil in the supplied grease tank with the pump and supplies the lubricant oil to the blade rotating ring bearing, and the grease discharge device that forcibly sucks and recovers the discharged grease from the blade rotating ring bearing. Thus, new lubricant oil can be automatically supplied from the grease supply device to the blade rotating ring bearing, and used degraded lubricant oil can be automatically recovered from the blade rotating ring bearing. Specifically, in the rotor head rotated by the wind power, the new lubricant oil can be pumped by the pump and reliably supplied to the blade rotating ring bearing, and the degraded used lubricant oil can be forcibly sucked and reliably recovered from the blade rotating ring bearing.

In the above-described invention, it is preferable that the grease discharge device includes a vacuum pump that sucks and recovers the lubricant oil from the blade rotating ring bearing, a reservoir tank that stores the recovered discharged grease, and a discharged grease channel connecting from the blade rotating ring bearing via the vacuum pump to the reservoir tank, and the reservoir tank is placed near the center of rotation axis of the rotor head. In particular, the reservoir tank is placed near the center of rotation axis of the rotor head, and thus influence of a centrifugal force that acts by rotating the rotor head can be suppressed to the minimum to reliably recover the discharged grease.

In the above-described invention, the grease supply device and the grease discharge device are preferably synchronously operated in the grease supply and discharge device, and this allows smooth supply of the lubricant oil and recovery of the discharged grease.

Advantageous Effects of Invention

According to the wind turbine generator of the present invention described above, the grease supply and discharge device is provided in the rotor head rotated by the wind power, and thus new lubricant oil can be pumped by the pump and reliably supplied to the blade rotating ring bearing, and degraded used lubricant oil can be forcibly sucked and reliably recovered from the blade rotating ring bearing in the reservoir tank. Thus, for the blade rotating ring bearing that supports the wind turbine blade so that a pitch angle of the wind turbine blade can be adjusted, the grease supply and discharge system of the lubricant oil can be improved to reliably recover the discharged grease. This can prevent or reduce leak of the discharged grease to the outside through an oil seal of the blade rotating ring bearing.

DESCRIPTION OF EMBODIMENTS

Now, an embodiment of a wind turbine generator according to the present invention will be described with reference to the drawings.

Figure 3:
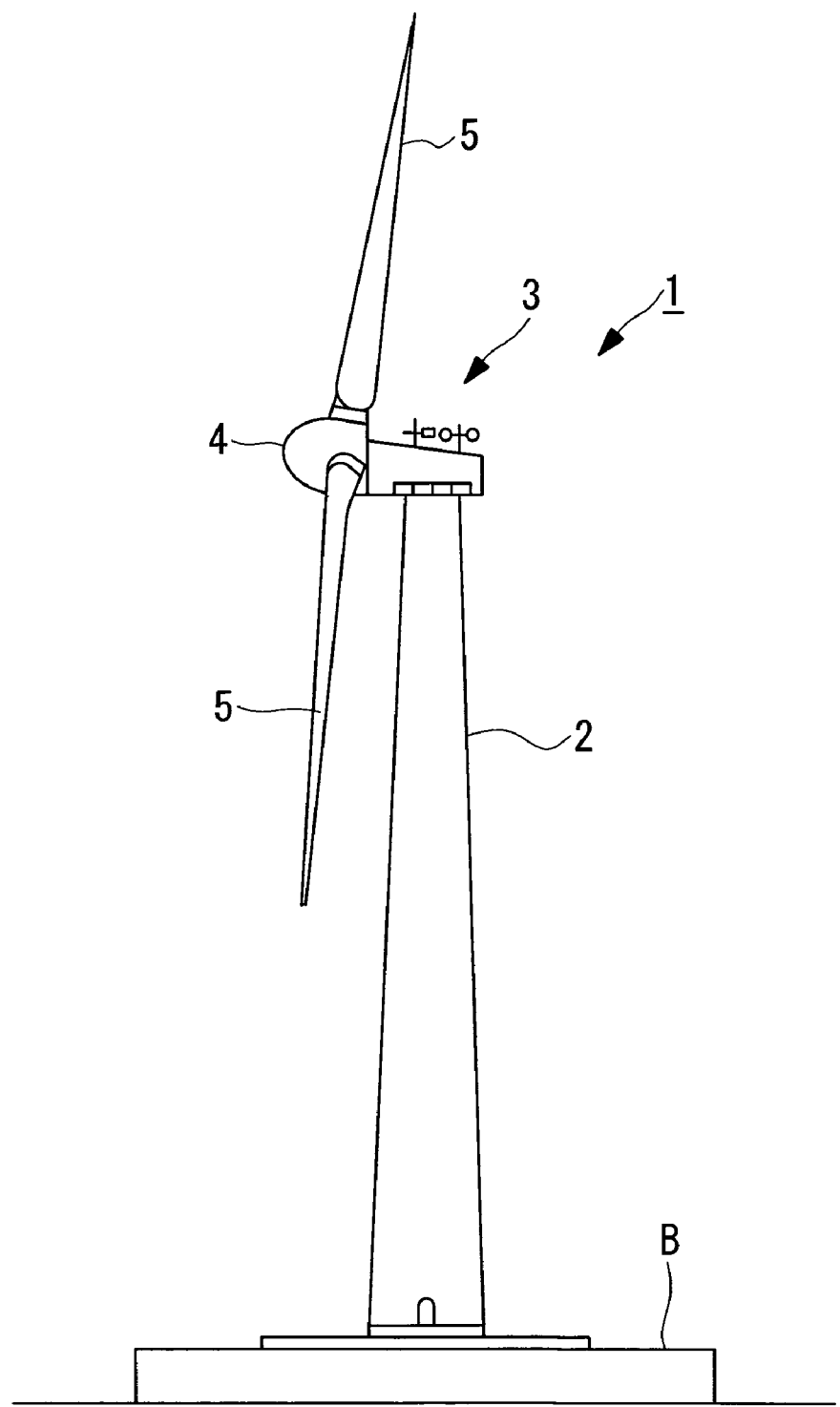
FIG. 3 is a side view showing an outline of the wind turbine generator.

A wind turbine generator 1 shown in FIG. 3 includes a wind turbine tower (hereinafter referred to as "tower") 2 standing on a foundation B, a nacelle 3 installed on an upper end of the tower 2, and a rotor head 4 supported rotatably around a substantially horizontal, lateral rotation axis and provided on a front end side of the nacelle 3.

A plurality of (for example, three) wind turbine blades 5 are mounted to the rotor head 4 radially around the rotation axis. Thus, wind power applied to the wind turbine blade 5 from a direction of the rotation axis of the rotor head 4 is converted into power for rotating the rotor head 4 around the rotation axis.

In an appropriate position (for example, an upper portion) on an outer peripheral surface of the nacelle 3, an anemometer that measures a wind speed value of the surroundings, an anemoscope that measures a wind direction, and the like are installed.

Specifically, in the wind turbine generator 1, the rotor head 4 rotated around the substantially horizontal rotation axis by wind power applied to the wind turbine blade 5 drives a generator (not shown) installed in the nacelle 3 and generates electricity, and the nacelle 3 is installed on the upper end of the tower 2 standing on the foundation B and can yaw.

The shown tower 2 is a monopole tower made of steel, and flanges (not shown) of a plurality of divided tower sections are connected to form a cylindrical tower ensuring a required length (height).

Figure 1:
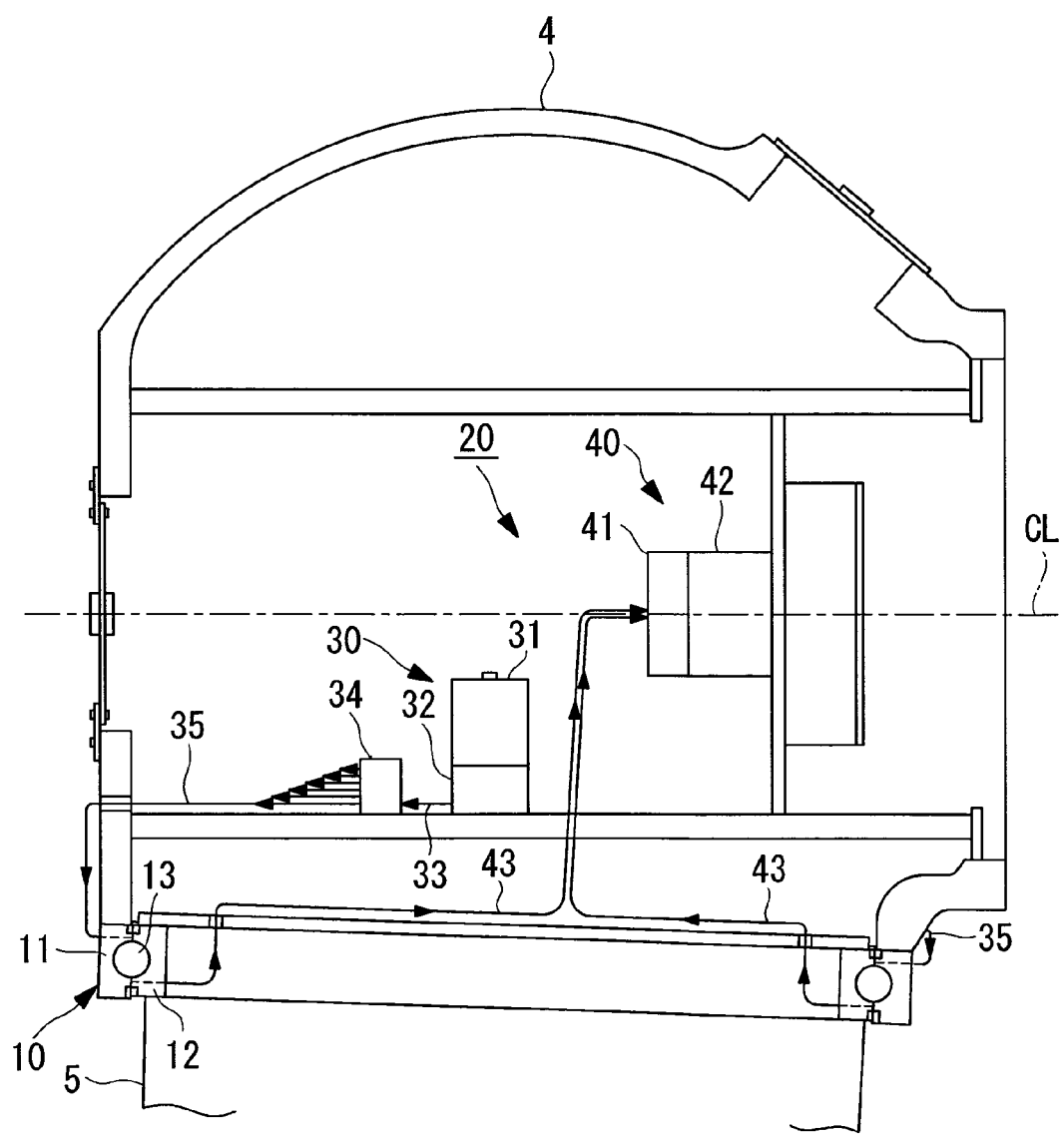
FIG. 1 is a sectional view of a rotor head showing a grease supply and discharge device of lubricant oil for a blade rotating ring bearing as an embodiment of a wind turbine generator according to the present invention.

The wind turbine generator 1 includes, for example as shown in FIG. 1, a pitch control mechanism (device) that can adjust a pitch angle of the wind turbine blade 5 via a blade rotating ring bearing 10 provided between the wind turbine blade 5 and the rotor head 4. The pitch control mechanism is a device for adjusting a pitch angle of each wind turbine blade 5 depending on wind conditions as a natural phenomenon, that is, depending on constantly varying wind speed, setting the pitch angle to an optimum value, and controlling a rotational speed of the rotor head 4.

The pitch control device uses an unshown hydraulic mechanism or the like as a drive source to rotate the wind turbine blade 5 in a desired direction and adjust the pitch angle. Thus, the wind turbine blade 5 is rotatably supported on the rotor head 4 via the blade rotating ring bearing 10.

A rolling bearing with a rolling element 13 such as a ball bearing or a roller held between an outer ring 11 and an inner ring 12 is used as the blade rotating ring bearing 10.

In the shown exemplary configuration, the outer ring 11 is secured to the rotor head 4, and the wind turbine blade 5 coupled to the inner ring 12 is rotatable with respect to the outer ring 11 and the rotor head 4. To maintain smooth rotation of the inner ring 12 and the wind turbine blade 5, grease as lubricant oil is supplied to, for example, an outer peripheral surface of the rolling element 13 and slide surfaces of the outer ring 11 and the inner ring 12 in contact with the outer peripheral surface. The grease is sealed by an unshown seal structure so as not to leak from a predetermined region.

To lubricate the blade rotating ring bearing 10, that is, to supply lubricant oil to the blade rotating ring bearing 10 (grease supply) and recover discharged grease from the blade rotating ring bearing 10 (grease discharge), a grease supply and discharge device 20 is provided in the rotor head 4. The discharged grease in this case refers to degraded lubricant oil used for lubricating the blade rotating ring bearing 10 and to be finally disposed of.

Figure 2:
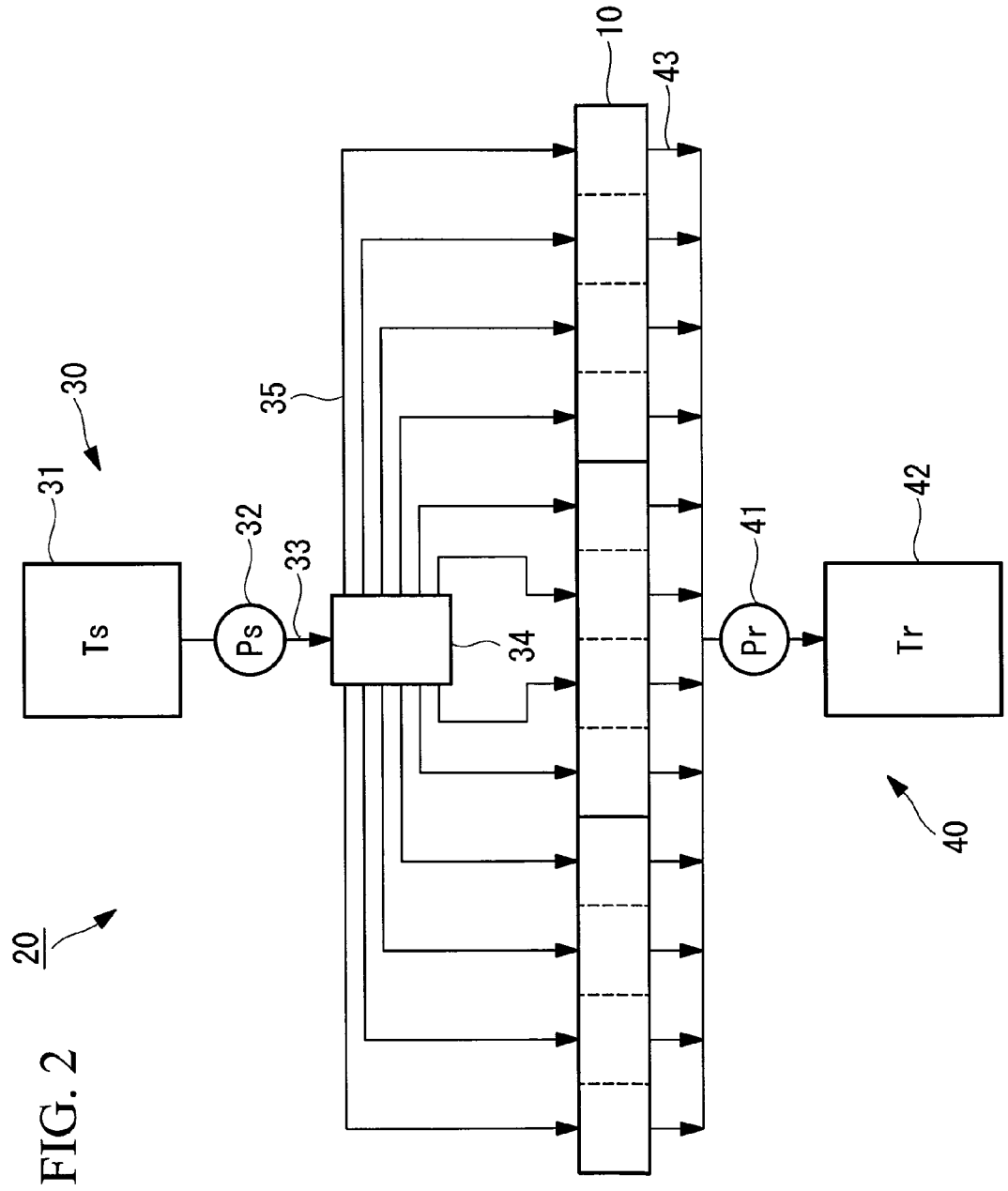
FIG. 2 is a system diagram showing an example of a grease supply and discharge system of the grease supply and discharge device in FIG. 1.

As shown in FIGS. 1 and 2, the grease supply and discharge device 20 in this embodiment includes a grease supply device 30 and a grease discharge device 40 described below.

The grease supply device 30 is a device that pumps lubricant oil in a supplied grease tank 31 with a grease supply pump 32 and automatically supplies the lubricant oil to the blade rotating ring bearing 10. The grease supply pump 32 is coupled via a supplied grease outlet pipe 33 to a distributor 34, and further coupled to a grease supply portion of the blade rotating ring bearing 10 via a plurality of grease supply pipes 35 branching from the distributor 34.

In the shown exemplary configuration, three wind turbine blades 5 are mounted to the rotor head 4, and four grease supply portions are provided in the blade rotating ring bearing 10 of each wind turbine blade 5, and thus a total of 12 grease supply pipes 35 are provided branching from the distributor 34, but not limited to this.

The grease discharge device 40 is a device that forcibly sucks and recovers the discharged grease from the blade rotating ring bearing 10. The grease discharge device 40 includes a vacuum pump 41 that sucks and recovers lubricant oil from the blade rotating ring bearing 10, a reservoir tank 42 that stores the recovered discharged grease, and a grease discharge pipe 43 that forms a discharged grease channel connecting from each blade rotating ring bearing 10 via the vacuum pump 41 to the reservoir tank 42.

In the shown exemplary configuration, four grease discharge portions are provided in the blade rotating ring bearing 10 of each wind turbine blade 5, and thus a total of 12 grease discharge pipes 43 are collectively connected to one vacuum pump 41, but not limited to this.

The discharged grease sucked by the vacuum pump 41 is recovered in one reservoir tank 42, and the reservoir tank 42 is placed near the center of rotation axis CL of the rotor head 4.

The grease supply pump 32 and the vacuum pump 41 are desirably electric pumps. Electric power may be supplied to the pumps from a utility grid connected to the wind turbine generator 1, part of electric power generated by the wind turbine generator 1 may be used to drive the pumps, or a dedicated solar cell system or the like may be installed to obtain electric power for driving the pumps.

In the wind turbine generator 1 thus configured, the grease supply and discharge device 20 is provided in the rotor head 4, the lubricant oil in the supplied grease tank 31 is pumped by the grease supply pump 31 and supplied to the blade rotating ring bearing 10, the vacuum pump 41 forcibly sucks the discharged grease from the blade rotating ring bearing 10 and recovers the discharged grease in the reservoir tank 42. Thus, new lubricant oil can be automatically supplied from the grease supply device 30 to the blade rotating ring bearing 10, and the discharged grease can be automatically recovered from the blade rotating ring bearing 10.

Thus, even if the grease supply and discharge device 20 is installed in the rotor head 4 rotated by wind power, new lubricant oil can be pumped by the grease supply pump 32 and reliably supplied to the blade rotating ring bearing 10, and the degraded used lubricant oil (discharged grease) can be forcibly sucked by the vacuum pump 41 and reliably recovered from the blade rotating ring bearing 10 in the reservoir tank 42.

In particular, the reservoir tank 42 that recovers the discharged grease is placed near the center of rotation axis CL of the rotor head 4, and thus even if the rotor head 4 is rotated, the vacuum pump 41 can be constantly located in a gas portion. Thus, the discharged grease can be substantially uniformly recovered from the blade rotating ring bearing 10 of each wind turbine blade 5, and the discharged grease can be generally more reliably recovered.

Since the grease discharge device 40 is installed in the rotating rotor head 4, reliable recovery of the discharged grease is difficult with a simple recovery device such as an oil pan because the device is constantly vertically reversed with rotation.

In the grease supply and discharge device 20, the grease supply device 30 and the grease discharge device 40 are synchronously operated to allow smooth supply of the lubricant oil and recovery of the discharged grease. Specifically, simultaneous operation of the grease supply pump 32 and the vacuum pump 41 do not hinder pumping by the grease supply pump 32 and suction by the vacuum pump 41, and thus the simultaneous operation of the pumps forms flows of the lubricant oil and the discharged grease in the same direction, thereby allowing smooth grease supply and discharge by a synergistic effect.

The grease supply and discharge device 20 is operated for a predetermined time, for example, when a timer exceeds a set time or when cumulative rotation number of the rotor head 4 exceeds a predetermined value, and the grease can be automatically supplied to and discharged from the blade rotating ring bearing 10 without an operator reaching the rotor head 4 rotating at a high place.

As such, according to the wind turbine generator 1 of this embodiment, the grease supply and discharge device 20 is provided in the rotor head 4 rotated by wind power. Thus, new lubricant oil can be pumped by the grease supply pump 32 and reliably supplied to the blade rotating ring bearing 10 (grease supply), and degraded used lubricant oil can be forcibly sucked and reliably recovered from the blade rotating ring bearing 10 in the reservoir tank 42.

As a result, for the blade rotating ring bearing 10 that supports the wind turbine blade 5 so that a pitch angle of the wind turbine blade 5 can be adjusted, the grease supply and discharge system of the lubricant oil can be improved to reliably recover the discharged grease. This can prevent or reduce leak of the discharged grease to the outside through the oil seal of the blade rotating ring bearing 10 in the wind turbine generator 1.

Specifically, the discharged grease of the lubricant oil used in the blade rotating ring bearing 10 can be reliably recovered, and the lubricant oil leaking through the oil seal of the blade rotating ring bearing 10 is reduced. This can solve, for example, a problem that the rotation of the rotor head 4 causes the discharged grease to be scattered around the wind turbine generator 1.

The present invention is not limited to the above-described embodiment, and may be changed without departing from the gist thereof.

REFERENCE SIGNS LIST

1 wind turbine generator
2 wind turbine tower
3 nacelle
4 rotor head
5 wind turbine blade
10 blade rotating ring bearing
20 grease supply and discharge device
30 grease supply device
31 supplied grease tank
32 grease supply pump
40 grease discharge device
41 vacuum pump
42 reservoir tank
43 grease discharge pipe (discharged grease channel)

The invention claimed is:

1. A wind turbine generator, comprising:
a tower standing on a foundation,
a nacelle installed at an upper end of the tower,
an electric generator installed in the nacelle,
a wind turbine blade,
a rotor head coupled to the wind turbine blade via a blade rotating ring bearing, and rotatably supported by the nacelle to be rotated by wind power to drive the electric generator to generate electricity,
a pitch control mechanism configured to adjust a pitch angle of the wind turbine blade via the blade rotating ring bearing provided between the wind turbine blade and the rotor head,
a grease supply and discharge assembly disposed in the rotor head, the grease supply and discharge assembly including
 a grease supply device having a supplied grease tank and a pump for supplying lubricant oil from the supplied grease tank to the blade rotating ring bearing, and
 a grease discharge device for forcibly sucking and recovering discharged grease from the blade rotating ring bearing,
wherein
the grease discharge device includes
 a vacuum pump for sucking and recovering the discharged grease from the blade rotating ring bearing,
 a reservoir tank for storing the recovered discharged grease with a gas portion, and a discharged grease channel connecting the blade rotating ring bearing via the vacuum pump to the reservoir tank, the reservoir tank is placed near a rotation axis of the rotor head, and the vacuum pump is located in the gas portion of the reservoir tank.

2. The wind turbine generator according to claim 1, wherein the grease supply device and the grease discharge device are configured to synchronously operate in the grease supply and discharge assembly.

3. The wind turbine generator according to claim 1, wherein the grease supply device and the grease discharge device are configured to synchronously operate to allow smooth supply of the lubricant oil and recovery of the discharged grease.

4. The wind turbine generator according to claim 1, wherein the pump of the grease supply device and the vacuum pump of the grease discharge device are configured to simultaneously operate to allow smooth supply of the lubricant oil and recovery of the discharged grease.

5. The wind turbine generator according to claim 4, further comprising a timer, wherein the grease supply and discharge assembly is configured to operate when a value of the timer exceeds a set time.

6. The wind turbine generator according to claim 4, wherein the grease supply and discharge assembly is configured to operate when a cumulative number of rotations of the rotor head exceeds a predetermined value.

7. The wind turbine generator according to claim 1, further comprising a timer, wherein the grease supply and discharge assembly is configured to operate when a value of the timer exceeds a set time.

8. The wind turbine generator according to claim 1, wherein the grease supply and discharge assembly is configured to operate when a cumulative number of rotations of the rotor head exceeds a predetermined value.

* * * * *